US012122171B2

(12) United States Patent
Takemoto et al.

(10) Patent No.: US 12,122,171 B2
(45) Date of Patent: Oct. 22, 2024

(54) INKJET PRINTING DEVICE, BOX-MAKING MACHINE, AND CORRUGATING MACHINE

(71) Applicant: MITSUBISHI HEAVY INDUSTRIES MACHINERY SYSTEMS, LTD., Hyogo (JP)

(72) Inventors: Shuichi Takemoto, Hyogo (JP); Norifumi Tasaka, Hyogo (JP); Kazutaka Tokumo, Hyogo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 140 days.

(21) Appl. No.: 17/790,246

(22) PCT Filed: Jan. 26, 2021

(86) PCT No.: PCT/JP2021/002674
§ 371 (c)(1),
(2) Date: Jun. 30, 2022

(87) PCT Pub. No.: WO2021/153568
PCT Pub. Date: Aug. 5, 2021

(65) Prior Publication Data

US 2023/0034116 A1 Feb. 2, 2023

(30) Foreign Application Priority Data

Jan. 31, 2020 (JP) ................................ 2020-014634

(51) Int. Cl.
*B41J 3/28* (2006.01)
*B31B 50/25* (2017.01)
(Continued)

(52) U.S. Cl.
CPC ............... *B41J 3/286* (2013.01); *B31B 50/25* (2017.08); *B31B 50/88* (2017.08); *B41J 3/51* (2013.01);
(Continued)

(58) Field of Classification Search
CPC . B41J 3/286; B41J 11/008; B41J 11/68; B41J 3/51; B41J 3/01; B31B 50/25; B31B 50/88; B31B 2100/0026; B31B 2110/35
See application file for complete search history.

(56) References Cited

U.S. PATENT DOCUMENTS 5,906,156 A 5/1999 Shibuya et al.
6,090,027 A 7/2000 Brinkman
(Continued)

FOREIGN PATENT DOCUMENTS

CN 108290365 A 7/2018
CN 108349266 A 7/2018
(Continued)

OTHER PUBLICATIONS

International Search Report of International Application No. PCT/JP2021/002674 mailed Apr. 6, 2021; 3pp.
(Continued)

*Primary Examiner* — Jason S Uhlenhake
(74) *Attorney, Agent, or Firm* — HAUPTMAN HAM, LLP

(57) ABSTRACT

This inkjet printing device comprises a conveyance path by which a sheet to be assembled as a corrugated cardboard box having a plurality of walls is conveyed in a conveyance direction, and inkjet heads that are positioned facing the surface of the sheet in the conveyance path and that can print a printed pattern in predetermined print ranges of an intersecting direction that intersects the conveyance direction along the surface of the sheet. The inkjet heads are posi-
(Continued)

tioned so that the print ranges span between first regions, which are intended to be first walls when the sheet is assembled into a corrugated cardboard box, and second regions, which are adjacent to the first regions in the intersecting direction and are intended to be second walls separate from the first walls.

18 Claims, 8 Drawing Sheets

(51) Int. Cl.

| | |
|---|---|
| ***B31B 50/88*** | (2017.01) |
| ***B41J 3/51*** | (2006.01) |
| ***B41J 11/00*** | (2006.01) |
| ***B41J 11/68*** | (2006.01) |
| *B31B 100/00* | (2017.01) |
| *B31B 110/35* | (2017.01) |
| *B41J 3/01* | (2006.01) |

(52) U.S. Cl.

CPC .............. *B41J 11/008* (2013.01); *B41J 11/68* (2013.01); *B31B 2100/0026* (2017.08); *B31B 2110/35* (2017.08); *B41J 3/01* (2013.01)

(56) References Cited

U.S. PATENT DOCUMENTS

| | | | | |
|---|---|---|---|---|
| 2002/0024577 | A1 | 2/2002 | Takeya et al. | |
| 2007/0247505 | A1 | 10/2007 | Isowa et al. | |
| 2011/0234724 | A1 | 9/2011 | Hoover et al. | |
| 2018/0072073 | A1 * | 3/2018 | Makuta | C09D 11/033 |
| 2018/0200906 | A1 * | 7/2018 | Senoo | B26D 5/007 |
| 2018/0215119 | A1 * | 8/2018 | Kaji | B41J 3/407 |
| 2018/0253263 | A1 | 9/2018 | Hower et al. | |
| 2018/0345619 | A1 | 12/2018 | Lang et al. | |
| 2019/0084267 | A1 | 3/2019 | Staedele et al. | |
| 2021/0347140 | A1 | 11/2021 | Tasaka et al. | |

FOREIGN PATENT DOCUMENTS

| | | | | |
|---|---|---|---|---|
| JP | H10286939 | A | | 10/1998 |
| JP | 2002037224 | A | | 2/2002 |
| JP | 2007302000 | A | | 11/2007 |
| JP | 2008012842 | A | | 1/2008 |
| JP | 2009248559 | A | | 10/2009 |
| JP | 2011046003 | A | | 3/2011 |
| JP | 2017001265 | A | | 1/2017 |
| JP | 2017035755 | A | | 2/2017 |
| JP | 2017081032 | A | * | 5/2017 |
| JP | 2017154315 | A | | 9/2017 |
| JP | 2018086792 | A | | 6/2018 |
| JP | 2019006576 | A | | 1/2019 |
| JP | 2019055588 | A | | 4/2019 |
| JP | 2020015616 | A | | 1/2020 |
| WO | 2016072098 | A1 | | 5/2016 |
| WO | 2016194729 | A1 | | 12/2016 |

OTHER PUBLICATIONS

Written Opinion of International Application No. PCT/JP2021/002674 mailed Jul. 28, 2022; 6pp.
Extended European Search Report for European Application No. 21747115.0 mailed Nov. 23, 2022; 11pp.
Office Action for Japanese Application No. 2020-014634 mailed Dec. 27, 2022; 14pp.

* cited by examiner

INKJET PRINTING DEVICE, BOX-MAKING MACHINE, AND CORRUGATING MACHINE

RELATED APPLICATIONS

The present application is a National of Phase of International Application Number PCT/JP2021/002674 filed Jan. 26, 2021 and claims priority to Japanese Application Number 2020-014634 filed Jan. 31, 2020.

TECHNICAL FIELD

This application relates to an inkjet printing device that performs inkjet printing on a sheet as a box-making material used to assemble a corrugated box, to a box making machine with the inkjet printing device, and to a corrugating machine with the inkjet printing device.

BACKGROUND ART

In recent years, various inkjet printing devices have been developed that perform inkjet printing on a sheet as a box-making material used to assemble a corrugated box.

The inkjet printing device is mounted in various machines related to cardboard manufacturing, such as a corrugating machine that manufactures a cardboard sheet from liners and a medium and a box making machine that manufactures a folded cartonboard box from a cardboard sheet (refer to, for example, PTL 1 and PTL 2). The inkjet printing device of PTL 1 or PTL 2 can print a predetermined print pattern on a sheet in a manufacturing process in the corrugating machine or the box making machine.

In the related art, for example, an identification code such as a barcode or a QR code (registered trademark) is printed on a sheet using an inkjet printing device mounted in a corrugating machine or a box making machine.

In order to improve discrimination of a sheet in a state where the sheet is assembled into a corrugated box, such an identification code may be printed on a plurality of surfaces (wall portions) of the corrugated box.

For this reason, in the inkjet printing device of the related art, a large number of inkjet heads are mounted to be able to print the identification code in each of regions that are planned to form the plurality of wall portions in a state of the sheet in which the corrugated box is unfolded in a flat shape.

FIG. 7 is a view describing an example of disposition of inkjet heads in an inkjet printing device mounted in a box making machine of the related art, and illustrates a plan view of a cardboard sheet 90 having a rectangular flat plate shape that is to be processed into an A-type corrugated box by the box making machine. The cardboard sheet 90 is transported from upstream to downstream (from top to bottom on the drawing sheet) along a transport direction MD with one of long sides facing a downstream side.

In the cardboard sheet 90, regions 32W, 32X, 32Y, and 32Z that are planned to form four side wall portions (a pair of length surfaces and a pair of width surfaces) when the cardboard sheet 90 is assembled into a corrugated box are aligned in an intersecting direction CD intersecting the transport direction MD. The intersecting direction CD corresponds to an apparatus width direction or a width direction of the sheet, which is orthogonal to the transport direction MD.

Regions 31W, 31X, 31Y, and 31Z that are planned to form one (a pair of outer flaps and a pair of inner flaps) of a top surface and a bottom surface of the corrugated box when the cardboard sheet 90 is assembled into the corrugated box are located on a downstream side of the regions 32W to 32Z in the transport direction MD, and regions 33W, 33X, 33Y, and 33Z that are planned to form the other (a pair of outer flaps and a pair of inner flaps) of the top surface and the bottom surface are located on an upstream side.

When the cardboard sheet 90 is assembled into the corrugated box, the regions 32W and 32Y form a pair of length surfaces, and the regions 32X and 32Z form a pair of width surfaces. In addition, the regions 31W and 31Y form one pair of outer flaps of the top surface and the bottom surface, and the regions 31X and 31Z form one pair of inner flaps of the top surface and the bottom surface. In addition, the regions 33W and 33Y form the other pair of outer flaps of the top surface and the bottom surface, and the regions 33X and 33Z form the other pair of inner flaps of the top surface and the bottom surface.

As illustrated in FIG. 7, four inkjet heads 90W, 90X, 90Y, and 90Z are provided along the intersecting direction CD to face surfaces of the cardboard sheet 90.

The heads 90W, 90X, 90Y, and 90Z are disposed in one-to-one correspondence with four regions (specifically, the regions 31W to 31Z, the regions 32W to 32Z, or the regions 33W to 33Z) aligned in the intersecting direction CD.

For this reason, the head 90W is used to perform printing on the regions 31W, 32W, and 33W aligned in the transport direction MD. The head 90X is used to perform printing on the regions 31X, 32X, and 33X aligned in the transport direction MD. The head 90Y is used to perform printing on the regions 31Y, 32Y, and 33Y aligned in the transport direction MD. The head 90Z is used to perform printing in the regions 31Z, 32Z, and 33Z aligned in the transport direction MD. The inkjet heads 90W to 90Z print an identification code 94 in each of the regions corresponding to six surfaces forming an external appearance of the corrugated box (for example, the regions 32W, 32X, 32Y, and 32Z, the region 31Y, and the region 33Y).

In addition, FIG. 8 is a view describing an example of disposition of inkjet heads in an inkjet printing device mounted in a corrugating machine of the related art. In the corrugating machine, a slitter scorer slits a cardboard web along the transport direction MD to create a plurality of pieces of cardboard webs, and a cutoff device cuts the plurality of pieces of cardboard webs in the intersecting direction CD to create one piece of cardboard sheet (cardboard sheet).

FIG. 8 illustrates a plan view of a bottom liner 91 that is used by the corrugating machine to manufacture a cardboard sheet. The bottom liner 91 is illustrated as being divided into a plurality of pieces of bottom liners 93 at locations that are planned to be slit by the slitter scorer (planned slitting lines indicated by one-dot chain lines). In addition, in each of the plurality of pieces of bottom liners 93, locations that are planned to be slit by the cutoff device (planned cutting lines) are indicated by two-dot chain lines. For this reason, in the bottom liner 91, a range 93*a* surrounded by the planned slitting line and a pair of the planned cutting lines (two-dot chain lines) aligned in the transport direction MD corresponds to one piece of cardboard sheet.

In each of the plurality of pieces of bottom liners 93, regions 42W, 42X, 42Y, and 42Z that are planned to form four side wall portions (a pair of length surfaces and a pair of width surfaces) when the cardboard sheet is assembled into a corrugated box are aligned in the transport direction MD.

Regions 41W, 41X, 41Y, and 41Z that are planned to form one (a pair of outer flaps and a pair of inner flaps) of a top surface and a bottom surface of the corrugated box are located on one side of the regions 42W, 42X, 42Y, and 42Z in the intersecting direction CD, and regions 43W, 43X, 43Y, and 43Z that are planned to form the other (a pair of outer flaps and a pair of inner flaps) of the top surface and the bottom surface are located on the other side.

As illustrated in FIG. 8, three inkjet heads 95X, 95Y, and 95Z are provided along the intersecting direction CD for a piece of the bottom liner 93 to face a surface of the bottom liner 93.

The heads 95X, 95Y, and 95Z are disposed in one-to-one correspondence with three regions (specifically, the regions 41W, 41X, 41Y, and 41Z, the regions 42W, 42X, 42Y, and 42Z, or the regions 43W, 43X, 43Y, and 43Z) aligned in the intersecting direction CD.

For this reason, the head 95X is used to perform printing on the regions 41W to 41Z aligned in the transport direction MD. The head 95Y is used to perform printing on the regions 42W to 42Z aligned in the transport direction MD. The head 95Z is used to perform printing on the regions 43W to 43Z aligned in the transport direction MD. The inkjet heads 95X to 95Z print the identification code 94 in each of the regions corresponding to six surfaces forming an external appearance of the corrugated box (for example, the regions 42W, 42X, 42Y, and 42Z, the region 41Y, and the region 43Y).

The three heads 95X, 95Y, and 95Z are provided in one-to-one correspondence with the plurality of pieces of bottom liners 93. For this reason, when the corrugating machine has a structure to create, for example, four pieces of cardboard sheets (making four pieces), since the three heads 95X, 95Y, and 95Z are provided for each of four pieces of the bottom liners 93, a total of 12 inkjet heads are mounted in the inkjet printing device.

CITATION LIST

Patent Literature

[PTL 1] Japanese Unexamined Patent Application Publication No. 2017-35755

[PTL 2] Japanese Unexamined Patent Application Publication No. 2017-154315

SUMMARY OF INVENTION

Technical Problem

The larger the number of the inkjet heads provided in the inkjet printing device is, the more maintenance cost such as initial investment cost for the inkjet printing device or operating cost for the inkjet heads tends to increase. For this reason, it is desirable that the number of the inkjet heads is reduced.

This application is devised in view of such problems, and one object of this application is to reduce the number of inkjet heads in an inkjet printing device. Incidentally, this application is not limited to the object, and another object of this application is to exhibit actions and effects that are derived from each configuration disclosed in modes for carrying out the invention to be described later but cannot be obtained by a technique in the related art.

Solution to Problem

According to this application, there is provided an inkjet printing device including: a transport path that transports a sheet as a box-making material to be assembled into a corrugated box including a plurality of wall portions, in a transport direction; and an inkjet head that is disposed to face a surface of the sheet in the transport path and that prints a predetermined print pattern in a predetermined printing range in an intersecting direction intersecting the transport direction along the surface of the sheet. The inkjet head is disposed such that the printing range extends over a first region planned to form a first wall portion when the sheet is assembled into the corrugated box, and over a second region that is adjacent to the first region in the intersecting direction and that is planned to form a second wall portion different from the first wall portion.

A box making machine of this application includes the inkjet printing device.

A corrugating machine of this application includes the inkjet printing device.

Advantageous Effects of Invention

According to this application, it is possible to perform printing on the first region and the second region adjacent to each other in the intersecting direction, with only one inkjet head. For this reason, when printing is performed on a plurality of regions that are planned to form wall portions when the sheet is assembled into the corrugated box, the number of the inkjet heads can be reduced when compared to a configuration in the related art where one inkjet head is provided for each of regions aligned in the intersecting direction. For this reason, maintenance cost such as initial investment cost for the inkjet printing device or operating cost for the inkjet heads is suppressed.

DESCRIPTION OF EMBODIMENTS

An inkjet printing device as an embodiment will be described with reference to the drawings. The following embodiments are provided as merely examples, and are not intended to exclude the application of various modifications or techniques that are not specified in the following embodiments. Each configuration of the present embodiment can be modified and implemented in various forms without departing from the concept of the present embodiment. In addition, the configurations can be selected as needed, or can be appropriately combined.

First, a first embodiment of a box making machine to which an inkjet printing device is applied will be described.

Next, a second embodiment of a corrugating machine to which an inkjet printing device is applied will be described.

In this specification, a "sheet" is a general term for a sheet material as a box-making material to be assembled into a corrugated box including a plurality of wall portions. Examples of the sheet include liner base papers (top liner sheet and bottom liner sheet), a medium base paper (medium sheet), and a cardboard web that are in the process of manufacturing by the corrugating machine, a cardboard sheet manufactured by the corrugating machine, a cardboard sheet in the process of manufacturing by the box making machine, and a folded cartonboard box manufactured by the box making machine.

A direction where the sheet is transported by the box making machine or by the corrugating machine is referred to as a transport direction MD. A direction intersecting the transport direction MD along a surface of the sheet that is transported in the transport direction MD is referred to as an intersecting direction CD. Here, the intersecting direction CD is a direction orthogonal to the transport direction MD, and corresponds to a machine width direction of the box making machine or of the corrugating machine or to a width direction of the sheet.

The term "upstream" written without any special description means an upstream side in the transport direction MD, and similarly, the term "downstream" written without any special description means a downstream side in the transport direction MD.

The terms "up" and "down" written without any special description mean an up-down direction in the box making machine or in the corrugating machine. The up-down direction is a direction orthogonal to the transport direction MD and to the intersecting direction CD.

The term "bottom (surface)" written without any special description means a side facing the outside in a state where the sheet is assembled into a corrugated box, and the term "top (back)" written without any special description means a side opposite the "bottom (surface)".

A. First Embodiment

[I. Box Making Machine]

[1. Overall Configuration]

Figure 1:
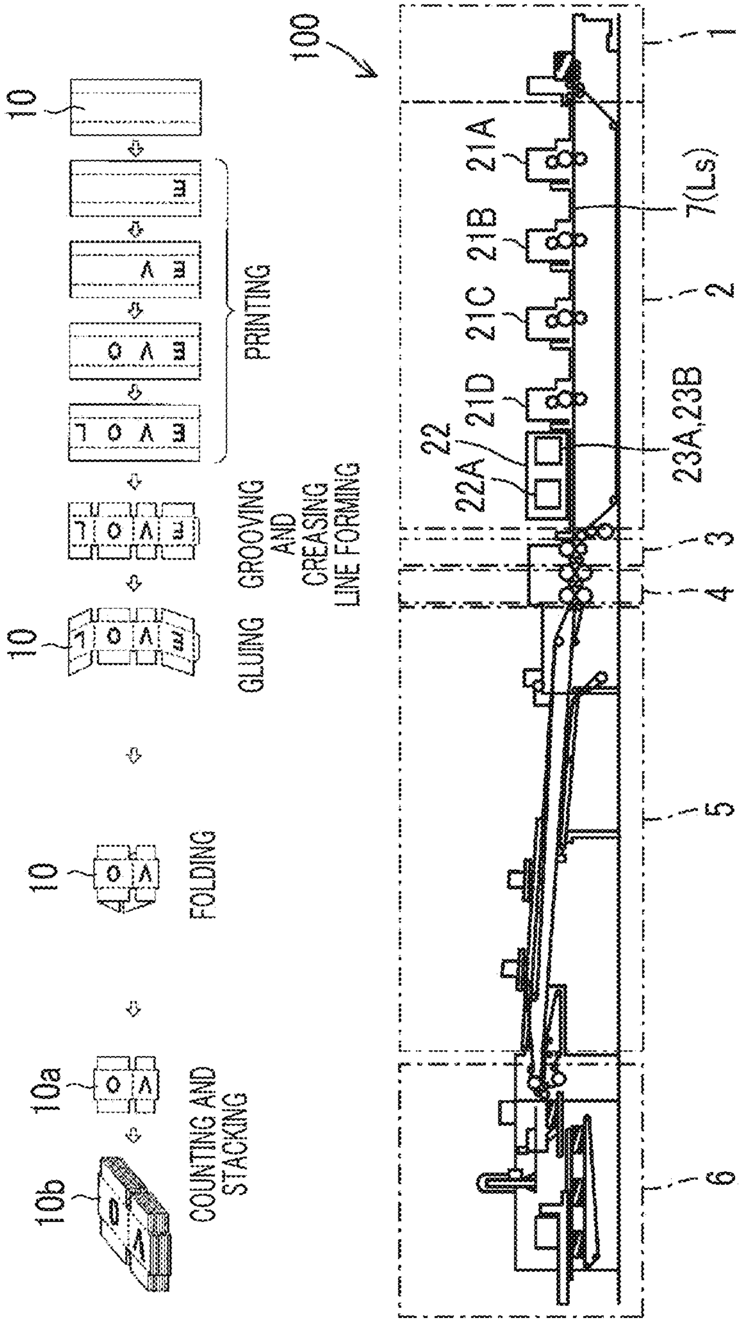
FIG. 1 is a descriptive view of a box making machine including an inkjet printing device according to a first embodiment.

FIG. 1 is a descriptive view describing an overall configuration of a box making machine 100 according to a first embodiment.

The box making machine 100 is a folding apparatus (corrugated box-manufacturing apparatus) that manufactures a folded cartonboard box 10*a* by performing processing such as printing, grooving, creasing line forming, punching, gluing, and folding on a cardboard sheet 10 manufactured by the corrugating machine.

The cardboard sheet 10 is a rectangular plate-shaped sheet formed to the size of one box.

The folded cartonboard box 10*a* is obtained by performing the above-mentioned processing on the cardboard sheet 10, and is a sheet-like corrugated box that is not assembled in a cubic shape but is folded in a flat shape.

In FIG. 1, a case where the box making machine 100 manufactures the folded cartonboard box 10*a* that forms a so-called A-type corrugated box (mandarin orange box) is provided as an example, and processes where the cardboard sheet 10 is processed into the folded cartonboard box 10*a* are written above apparatus configurations of each step of the box making machine 100, separately from the apparatus configurations and in association with the apparatus configurations.

In the box making machine 100, the cardboard sheet 10 is transported in the transport direction MD in a posture where one of long sides of the cardboard sheet 10 faces downstream in the transport direction MD. The cardboard sheet 10 takes a posture where a flute of the cardboard sheet 10 is parallel to the transport direction MD.

A sheet feeding section 1, a printing section 2, a slotter creaser section 3, a die cutting section 4, a folding section 5, and a counter-ejector section 6 are provided in the box making machine 100 in order from the upstream side.

The sheet feeding section 1 is a unit that supplies (feeds) the cardboard sheet 10 to the printing section 2. A large number of cardboard sheets 10 are carried into the sheet feeding section 1 in a stacked state. The sheet feeding section 1 supplies the cardboard sheets 10 to the printing section 2 one by one.

The printing section 2 includes a transport conveyor 7 (transport path Ls) that transports the cardboard sheet 10 in the transport direction MD, and prints a predetermined picture pattern on the cardboard sheet 10 in transport by the transport conveyor 7.

Flexographic printing sections 21A to 21D of a predetermined number of colors (here, four colors) are disposed in the printing section 2 in order from the upstream side along the transport direction MD.

The flexographic printing sections 21A to 21D each include a plate cylinder on which a printing plate is mounted, and an impression roll that presses the cardboard sheet 10 against the plate cylinder, and sequentially print a picture pattern formed on the printing plates, on the cardboard sheet 10 in the transport path Ls with ink of the colors.

The diameters of the plate cylinders of the flexographic printing sections 21A to 21D are set to the same diameter, and the plate cylinders rotate at the same peripheral speed as a transport speed of the cardboard sheet 10 during printing.

An inkjet printing device 22 is provided on a downstream side of the flexographic printing sections 21A to 21D. The inkjet printing device 22 is a printing device that performs printing by an inkjet method, and prints a predetermined print pattern on the cardboard sheet 10 that is transported along the transport path Ls in the transport direction MD, based on digital data.

The flexographic printing sections 21A to 21D print the common picture pattern formed on the printing plates, on each of the cardboard sheets 10 whereas the inkjet printing device 22 can print different print patterns on the individual cardboard sheets 10. For this reason, the inkjet printing device 22 can be used to print, for example, an identification code that allows the individual cardboard sheets 10 to be identified. Incidentally, an installation location of the inkjet printing device 22 is not limited to the present embodiment, and the inkjet printing device 22 may be provided at any location in the box making machine 100 such as an upstream side of the flexographic printing sections 21A to 21D as long as printing can be performed on the cardboard sheet 10. A detailed configuration of the inkjet printing device 22 will be described later.

The slotter creaser section 3 performs grooving or creasing line forming on the cardboard sheet 10 printed by the printing section 2, and discharges the cardboard sheet 10.

The die cutting section 4 performs punching or additional grooving or creasing line forming on the cardboard sheet 10 discharged from the slotter creaser section 3.

The folding section 5 applies a glue to a gluing margin portion formed at one end of the cardboard sheet 10 in the width direction (intersecting direction CD) processed by the die cutting section 4, and folds the cardboard sheet 10 such that both end portions of the cardboard sheet 10 in the width direction overlap each other.

Both the end portions in the width direction are bonded to each other with the glue, so that the cardboard sheet 10 processed by the folding section 5 forms the sheet-like corrugated box (folded cartonboard box) 10*a*.

The counter-ejector section 6 is a section that stacks the folded cartonboard boxes 10*a* processed by the folding section 5, on a stacker table while counting the folded cartonboard boxes 10*a*. When a predetermined number of the folded cartonboard boxes 10*a* are stacked by the counter-ejector section 6, a sheet material group 10*b* is shipped as a unit batch.

[2. Detailed Configuration]

<Configuration of Inkjet Printing Device>

Next, a detailed configuration of the inkjet printing device 22 will be described.

The inkjet printing device 22 includes the transport path Ls that transports the cardboard sheet 10 in the transport direction MD, and two inkjet heads 23A and 23B (hereinafter, also simply referred to as "heads") that face a surface of the cardboard sheet 10 above the transport path Ls and that are disposed side by side in the intersecting direction CD (vertical direction with respect to the drawing sheet of FIG. 1). Incidentally, reference sign 23 is used when it is not necessary to distinguish between the individual heads 23A and 23B.

Each of the heads 23A and 23B includes a plurality of ink ejection ports at a lower surface portion thereof facing the cardboard sheet 10, and ejects the ink from the ink ejection ports located at positions corresponding to a predetermined print pattern, to print the print pattern on the cardboard sheet 10. The inkjet printing device 22 of FIG. 1 has a single pass-type structure where the inkjet printing device 22 completes the printing of the predetermined print pattern in one action in a process where the cardboard sheet 10 passes under the heads 23A and 23B once, with the heads 23A and 23B fixed. The plurality of ink ejection ports of each of the heads 23A and 23B are arranged along the intersecting direction CD. A range where the ink ejection ports are arranged defines printable ranges of the heads 23A and 23B in the intersecting direction CD ("printing ranges" denoted by reference signs P1A and P1B in FIG. 3 to be described later).

Figure 2A:
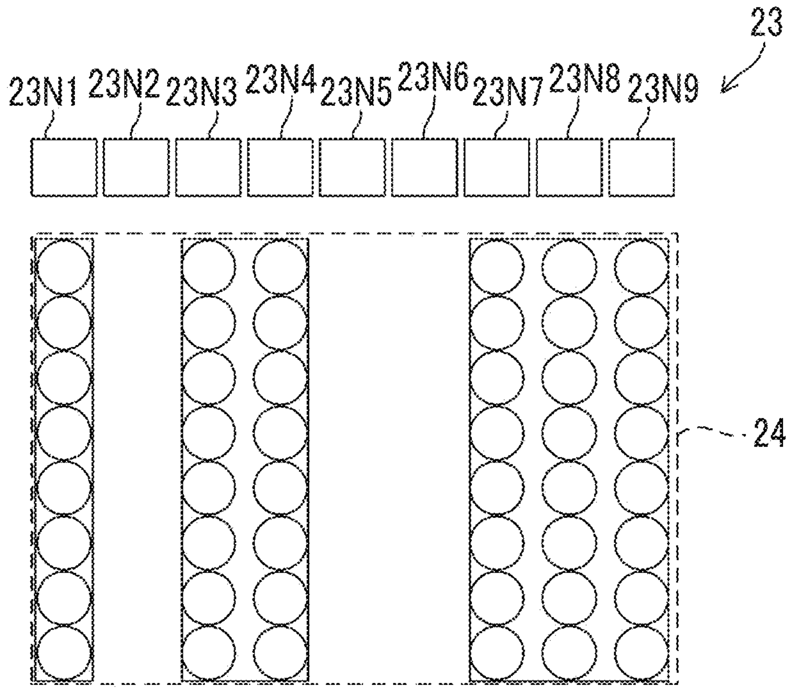
FIGS. 2A and 2B are descriptive views illustrating an arrangement of ink ejection ports.
Figure 2B:
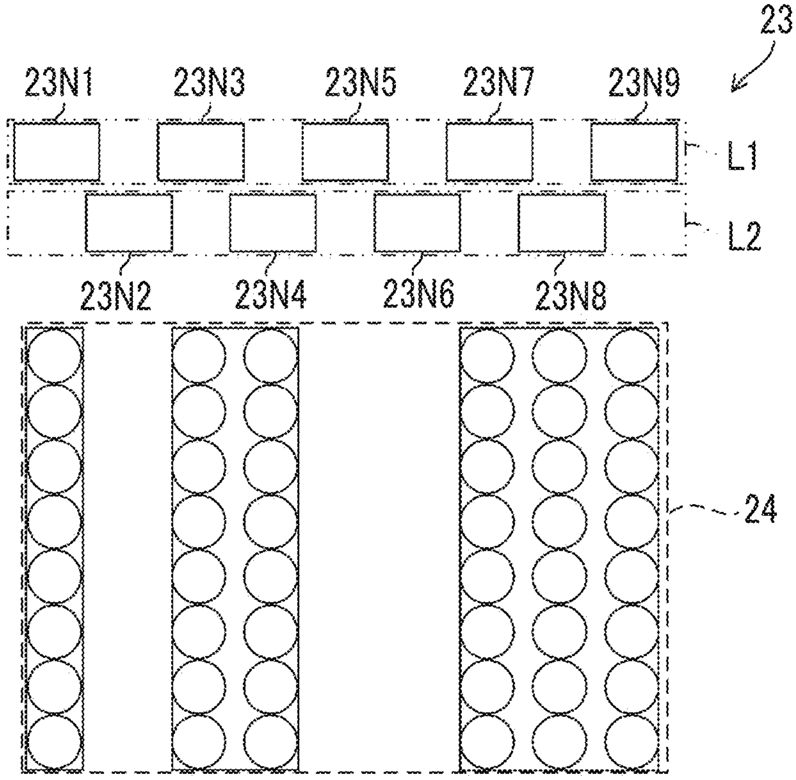

FIGS. 2A and 2B are descriptive views describing an arrangement of the ink ejection ports in one head 23 and a print pattern 24 (range surrounded by a broken line). Reference signs 23N1 to 23N9 denote nine (a plurality of) ink ejection ports, and each of circles superimposed on the print pattern 24 represents ink ejected in one ejection by one of the ink ejection ports 23N1 to 23N9.

For example, in FIG. 2A, the nine ink ejection ports 23N1 to 23N9 are arranged in a row along the intersecting direction CD. In this case, the ink is ejected a plurality of times from the ink ejection ports 23N1 to 23N9 in a process where the cardboard sheet 10 passes under the heads 23A and 23B once, to complete the printing of the print pattern 24.

In addition, in FIG. 2B, the nine ink ejection ports 23N1 to 23N9 are distributed and disposed in two rows, namely, a first row L1 and a second row L2 along the transport direction MD [refer to two-dot chain lines in FIG. 2B]. The ink ejection ports 23N1 to 23N9 are disposed in the two rows L1 and L2 with the positions thereof offset from each other in the transport direction MD (staggered disposition). For example, when the ink ejection ports 23N1 to 23N9 cannot be disposed laterally in one row due to the limitation of an installation space, the staggered disposition illustrated in FIG. 2B may be applied.

In this case, the ink ejection ports 23N1 to 23N9 in the two rows L1 and L2 eject the ink with a time lag to perform printing within the range of one row in the intersecting direction CD. In the two rows L1 and L2, the ink ejection ports 23N1 to 23N9 perform ink ejection with a time lag a plurality of times in a process where the cardboard sheet 10 passes under the heads 23A and 23B once, to complete the printing of the print pattern 24.

The number of the ink ejection ports in one head 23 is not limited to the illustrated example. For example, the number of rows along the transport direction MD may be 3 or more. When the number of rows is increased and an area corresponding to the disposition of the ink ejection ports is widened, as long as the print pattern 24 has a dimension within the range of the area, the printing of the print pattern can be completed only by ejecting the ink once in a process where the cardboard sheet 10 passes under the head 23 once. In this case, printing can be efficiently performed at high speed.

A control device 22A controls operation of the head 23 based on digital data representing the predetermined print pattern.

<Cardboard Sheet>

Figure 3:
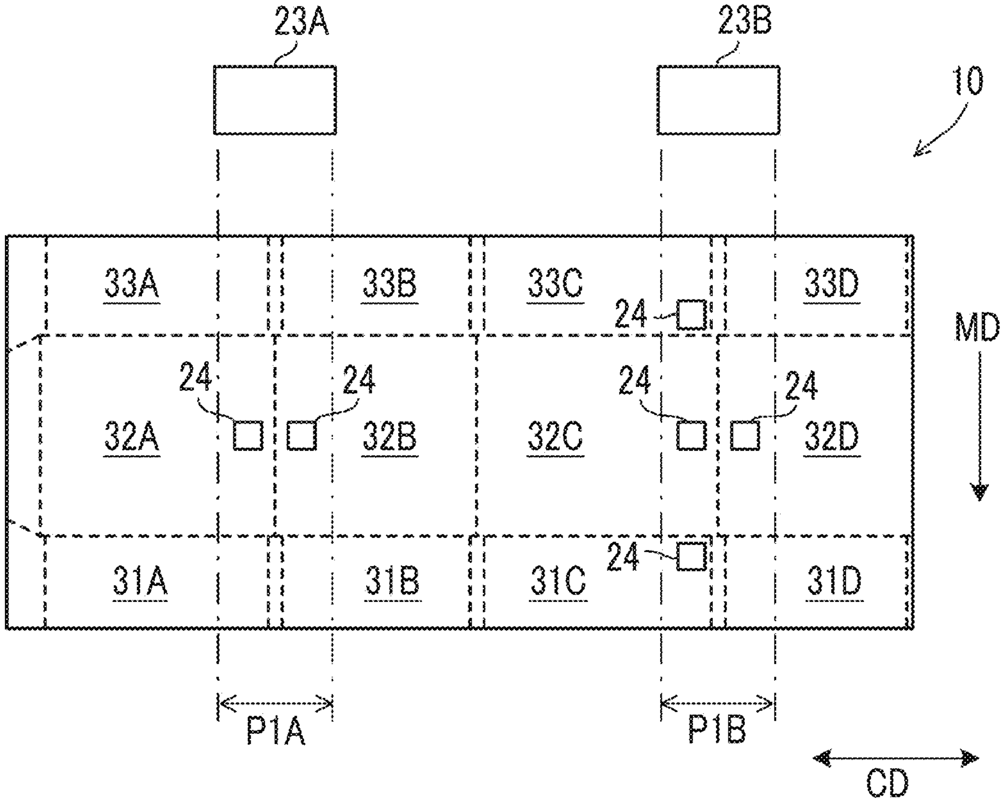
FIG. 3 is a descriptive view of an example of disposition of inkjet heads according to the first embodiment.

FIG. 3 is a descriptive view for describing an example of disposition of the heads 23A and 23B with respect to the cardboard sheet 10, and illustrates a plan view of the cardboard sheet 10 when viewed from above. A direction from a top toward a bottom of the drawing sheet corresponds to the transport direction MD, and a right-left direction of the drawing sheet corresponds to the intersecting direction CD. The cardboard sheet 10 is transported from upstream to downstream (from top to bottom on the drawing sheet) along the transport direction MD with one of the long sides facing the downstream side.

The cardboard sheet 10 of FIG. 3 has just passed through the inkjet printing device 22, and processing such as grooving, creasing line forming, and punching has not yet been performed thereon. In the cardboard sheet 10, locations where processing such as grooving, creasing line forming, and punching is planned to be performed (planned processing locations) are indicated by broken lines.

——Regions of Cardboard Sheet——

The cardboard sheet 10 is divided into 12 regions, namely, regions 31A to 31D, regions 32A to 32D, and regions 33A to 33D. The regions 31A to 31D, the regions 32A to 32D, and the regions 33A to 33D are partitioned off by broken lines.

In the cardboard sheet 10, the regions 32A, 32B, 32C, and 32D that are planned to form four side wall portions (a pair of length surfaces and a pair of width surfaces) when the cardboard sheet 10 is assembled into a corrugated box are aligned in the intersecting direction CD.

The regions 31A, 31B, 31C, and 31D that are planned to form one (a pair of outer flaps and a pair of inner flaps) of a top surface and a bottom surface of the corrugated box when the cardboard sheet 10 is assembled into the corrugated box are located on a downstream side of the regions 32A to 32D in the transport direction MD, and the regions 33A, 33B, 33C, and 33D that are planned to form the other (a pair of outer flaps and a pair of inner flaps) of the top surface and the bottom surface are located on an upstream side.

When the cardboard sheet 10 is assembled into the corrugated box, the regions 32A and 32C form a pair of length surfaces, and the regions 32B and 32D form a pair of width surfaces. In addition, the regions 31A and 31C form one pair of outer flaps of the top surface and the bottom surface, and the regions 31B and 31D form one pair of inner flaps of the top surface and the bottom surface. In addition, the regions 33A and 33C form the other pair of outer flaps of the top surface and the bottom surface, and the regions 33B and 33D form the other pair of inner flaps of the top surface and the bottom surface.

——Print Pattern——

In the cardboard sheet 10, the print pattern 24 is printed in each of six regions 32A, 32B, 32C, 32D, 31C, and 33C among the regions 31A to 31D, the regions 32A to 32D, and the regions 33A to 33D. Each of the regions 32A, 32B, 32C, 32D, 31C, and 33C is a region that is planned to form a wall portion forming an external appearance when the cardboard sheet 10 is assembled into the corrugated box. Incidentally, the surface (printing surface) of the cardboard sheet 10 is a surface facing the outside when the cardboard sheet 10 is assembled into the corrugated box.

In the following description, a case where the print pattern 24 is, for example, an identification code such as a QR code (registered trademark) or a barcode will be provided as an example. The identification code is, for example, a code that allows the cardboard sheets 10 to be individually identified, and includes information such as an ID number, a manufacturer, a manufacturing lot number, and a manufacturing date of the individual cardboard sheet 10. Hereinafter, the print pattern 24 will be described as being specified as an identification code 24.

The common identification code 24 is printed in each of the regions 32A, 32B, 32C, 32D, 31C, and 33C in one cardboard sheet 10.

<Disposition of Inkjet Heads>

The heads 23A and 23B of the first embodiment are disposed to print the identification code 24 on each of six surfaces (six wall portions) forming an external appearance when the cardboard sheet 10 is assembled into the corrugated box.

Specifically, the head 23A is disposed such that the printing range P1A extends over the regions 31A, 32A, and 33A aligned in the transport direction MD and over the regions 31B, 32B, and 33B that are adjacent to the regions 31A, 32A, and 33A in the intersecting direction CD and that are aligned in the transport direction MD.

For this reason, the head 23A can perform printing on the regions 31A, 32A, and 33A and on the regions 31B, 32B, and 33B. In FIG. 3, a case where the head 23A prints the identification code 24 in each of the regions 32A and 32B is provided as an example.

Regarding the regions 32A and 32B in which the identification code 24 is to be printed, the head 23A is disposed such that the printing range P1A extends over the region (first region) 32A that is planned to form one length surface (first wall portion) in a state where the cardboard sheet 10 is assembled into the corrugated box, and over the region (second region) 32B that is adjacent to the region 32A in the intersecting direction CD and that is planned to form one width surface (second wall portion different from the first wall portion).

In addition, the head 23B is disposed such that the printing range P1B extends over the regions 31C, 32C, and 33C aligned in the transport direction MD, and over the regions 31D, 32D, and 33D that are adjacent to the regions 31C, 32C, and 33C in the intersecting direction CD and that are aligned in the transport direction MD. For this reason, the head 23B can perform printing on the regions 31C, 32C, and 33C and on the regions 31D, 32D, and 33D. In FIG. 3, as an example, a case is provided in which the head 23B prints the identification code 24 in each of the regions 32C and 32D and the regions (third regions) 31C and 33C that are aligned with the region 32C in the transport direction MD and that are planned to form outer flaps (third wall portions different from the first wall portion and from the second wall portion) in a state where the cardboard sheet 10 is assembled into the corrugated box.

Regarding the regions 32C and 32D in which the identification code 24 is to be printed, the head 23B is disposed such that the printing range P1B extends over the region (first region) 32C that is planned to form the other length surface (first wall portion) in a state where the cardboard sheet 10 is assembled into the corrugated box, and over the region (second region) 32D that is adjacent to the region 32C in the intersecting direction CD and that is planned to form the other width surface (second wall portion different from the first wall portion).

In the present embodiment, as illustrated in FIG. 3, in a top view, the position of the head 23A in the intersecting direction CD is disposed such that a center of the printing range P1A in the intersecting direction CD coincides with the position of a boundary between the regions 31A, 32A, and 33A and the regions 31B, 32B, and 33B in the intersecting direction CD. In a top view, the position of the head 23B in the intersecting direction CD is disposed such that a center of the printing range P1B in the intersecting direction CD coincides with the position of a boundary between the regions 31C, 32C, and 33C and the regions 31D, 32D, and 33D in the intersecting direction CD.

Regarding planned processing locations where processing such as grooving, creasing line forming, and punching is to be performed, it can be said that the disposition of the heads 23A and 23B in the inkjet printing device 22 of the first embodiment is a disposition where the printing ranges P1A and P1B of the heads 23A and 23B extend over the planned processing locations extending in the transport direction MD, specifically, a planned grooving (slotting) location and a planned creasing line (crease) location.

<Inkjet Printing>

With the above disposition of the heads 23A and 23B, the identification code 24 can be printed in each of the regions 32A, 32B, 32C, 32D, 31C, and 33C that are planned to form the wall portions of the corrugated box, with only the two heads 23A and 23B.

The control device 22A controls the selection of ink ejection ports that eject the ink at each of the heads 23A and 23B, and the timing (printing timing) at which each ink ejection port ejects the ink, so that the identification code 24 having a predetermined picture pattern, a size, a shape, and a position is printed based on digital data.

In each of the printing ranges P1A and P1B of the heads 23A and 23B, one side of the printing range uses one of two regions (one of the regions 31A, 32A, and 33A and the regions 31B, 32B, and 33B or one of the regions 31C, 32C, and 33C and the regions 31D, 32D, and 33D), and the other side of the printing range uses the other of the two regions (the other of the regions 31A, 32A, and 33A and the regions 31B, 32B, and 33B or the other of the regions 31C, 32C, and 33C and the regions 31D, 32D, and 33D).

Specifically, a left half of the printing range P1A in FIG. 3 is used for printing in the regions 31A, 32A, and 33A, and a right half in FIG. 3 is used for printing in the regions 31B, 32B, and 33B. In addition, a left half of the printing range P1B in FIG. 3 is used for printing in the regions 31C, 32C, and 33C, and a right half in FIG. 3 is used for printing in the regions 31D, 32D, and 33D.

For example, when the identification code 24 is printed in the regions 32A and 32B by the head 23A, the ink is ejected from some ink ejection ports located within the left half of the printing range P1A in FIG. 3 and from some ink ejection ports located in the right half in FIG. 3 at a timing when the vicinity of a center of the regions 32A and 32B in the transport direction MD passes under the head 23A.

In addition, when the identification code 24 is printed in the region 31C by the head 23B, the ink is ejected from some ink ejection ports located within the left half of the printing range P1B in FIG. 3 at a timing when the vicinity of a right upper location in the region 31C in FIG. 3 passes under the head 23B.

The identification codes 24 of each of the regions 32A, 32B, 32C, 32D, 31C, and 33C can be printed at an arbitrary position as long as the position is within the printing ranges P1A and P1B. For example, the identification code 24 is printed in the vicinity of a center of the region 32A in the transport direction MD, but may be printed, for example, in the vicinity of one or the other edge of the region 32A in the transport direction MD (in the vicinity of a boundary between the region 32A and the region 33A or 31A).

In FIG. 3, the positions of the identification codes 24 in the transport direction MD in regions adjacent to each other in the intersecting direction CD (for example, the regions 32A and 32B) are aligned with each other, but the positions of the identification codes 24 in the transport direction MD may be different from each other.

The identification code 24 can be printed at a position where the identification code 24 does not interfere with other print patterns, according to the disposition of the other print patterns in a region.

<Printing Margin of Identification Code>

Each of the identification codes 24 is printed at a position that is a predetermined printing margin or more away from an edge of each of the regions 32A, 32B, 32C, 32D, 31C, and 33C in which the identification codes 24 are printed.

Figure 4:
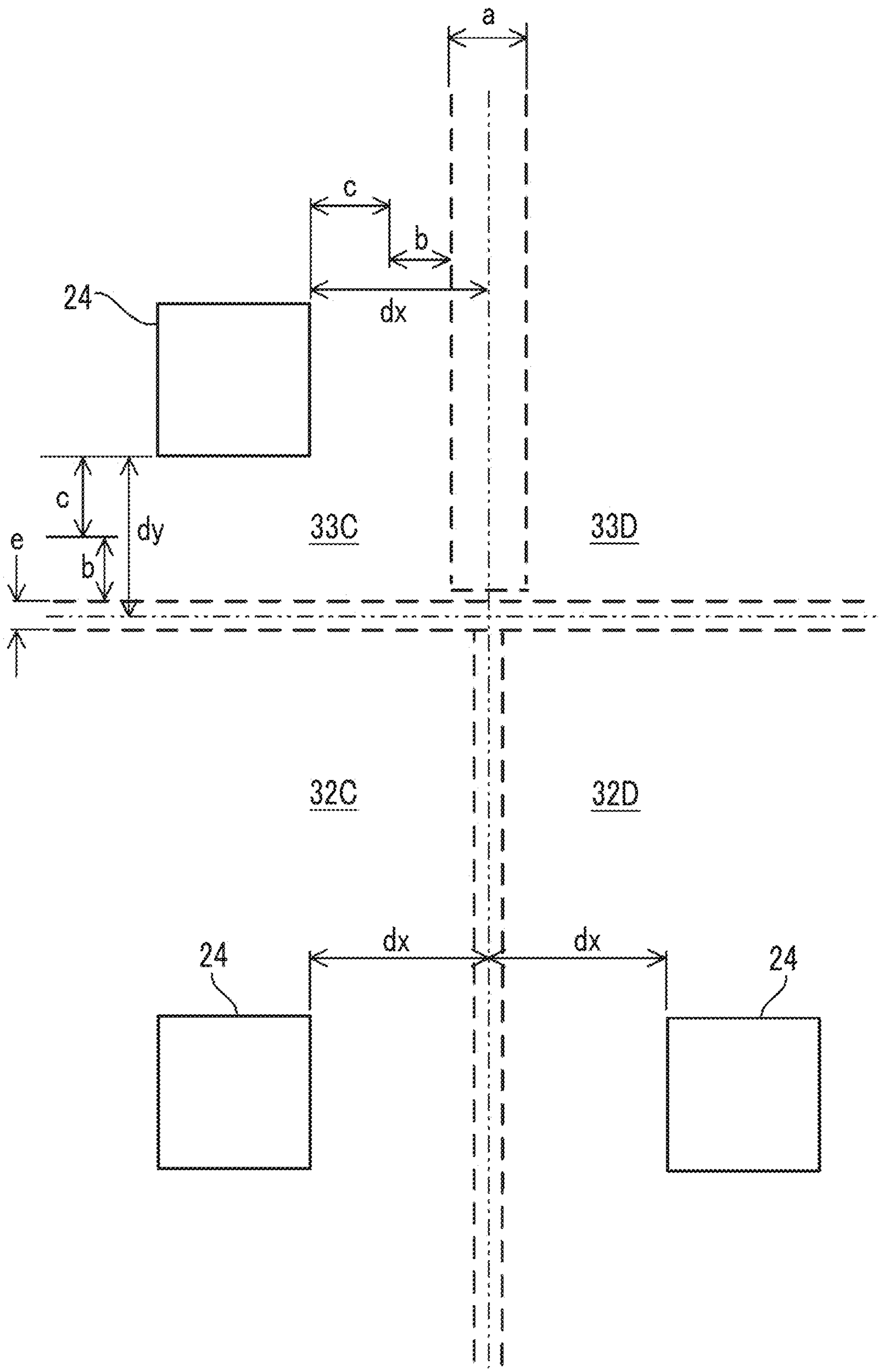
FIG. 4 is a descriptive view of a printing margin of a print pattern according to the first embodiment.

FIG. 4 is a descriptive view for describing the printing margin, and illustrates a part of the regions 32C, 32D, 33C, and 33D in the cardboard sheet 10 in an enlarged manner. In FIG. 4, two-dot chain lines indicate boundaries between the regions 32C, 32D, 33C, and 33D. A broken line between the regions 33C and 33D indicates a location (planned processing location) where slot (grooving) processing is planned to be performed. Broken lines between the regions 32C and 33C and between the regions 32D and 33D indicate locations where creasing line (score) processing is planned to be performed, and a broken line between the regions 32C and 32D indicates a location where creasing line (crease) processing is planned to be performed.

Incidentally, in FIG. 4, a width of a slot (dimension in the intersecting direction CD) and widths of a creasing line (dimension of a score in the transport direction MD and a dimension of a crease in the intersecting direction CD) are depicted in an exaggerated manner.

The printing margin is provided to secure a blank portion (quiet zone) required for the reading of the identification code 24, around the identification code 24 in a state where the sheet 10 is assembled into the corrugated box. As the printing margin, there are two types of margins, namely, a margin dx in the intersecting direction CD and a margin dy in the transport direction MD.

——Margin in Intersecting Direction CD——

The margin dx [mm] in the intersecting direction CD is an interval from an edge of the identification code 24 to a boundary (two-dot chain line) adjacent to the identification code 24 in the intersecting direction CD. For example, the margin dx is an interval from an edge on one side in the intersecting direction CD (right edge in the intersecting direction CD in FIG. 4) in the identification code 24 printed in the region 33C, to the boundary between the regions 33C and 33D.

dx [mm] is obtained by the following Equation 1 from a slot width a [mm], a creasing line position accuracy b [mm], and a quiet zone c [mm].

$$dx\ [\text{mm}]=(a\ [\text{mm}]/2)+b\ [\text{mm}]+c\ [\text{mm}] \qquad \text{Equation 1}$$

The slot width a [mm] is a width of a slot that is planned to be formed between the regions 33C and 33D (dimension of a planned processing location between the regions).

The creasing line position accuracy b [mm] is a value (dimension of a planned processing location between the regions) determined in consideration of a variation (error) of a creasing line (crease) that is planned to be formed between the regions 32C and 32D.

The quiet zone c [mm] is a dimension of a blank portion (blank portion in the intersecting direction CD) required for the reading of an image code such as a QR code (registered trademark) or a barcode. The dimension of the quiet zone c [mm] is a specified value (predetermined value) determined by the specifications or the standards of the identification code 24.

——Margin in Transport Direction MD——

The margin dy [mm] in the transport direction MD is an interval from an edge of the identification code 24 to a boundary (two-dot chain line) adjacent to the identification code 24 in the transport direction MD. For example, the margin dy is an interval from an edge on one side in the transport direction MD (lower edge in the transport direction MD in FIG. 4) in the identification code 24 printed in the region 33C, to the boundary between the regions 33C and 32C.

The margin dy [mm] is obtained by the following Equation 2 from a creasing line width e [mm], the creasing line position accuracy b [mm], and the quiet zone c [mm].

$$dy\ [\text{mm}]=(e\ [\text{mm}]/2)+b\ [\text{mm}]+c\ [\text{mm}] \qquad \text{Equation 2}$$

The creasing line width e [mm] is a width of a creasing line (score) that is planned to be formed between the regions 33C and 32C or between the regions 33D and 32D (dimension of a planned processing location between the regions).

The creasing line position accuracy b [mm] in the margin dy [mm] in the transport direction MD is a value (dimension of a planned processing location between the regions) determined in consideration of a variation (error) of the position of the creasing line (score).

The quiet zone c [mm] at the margin dy [mm] in the transport direction MD is a specified value determined by the specifications or the standards of the identification code 24 similar to the above description.

When the margin dx [mm] and the margin dy [mm] are obtained by Equations 1 and 2, it is possible to secure a predetermined quiet zone while considering deformation of the cardboard sheet 10 caused by folding along the creasing line (crease and score) when the cardboard sheet 10 is assembled into the corrugated box.

B. Second Embodiment

[II. Corrugating Machine]

[1. Overall Configuration]

Next, a corrugating machine according to a second embodiment will be described.

Figure 5:
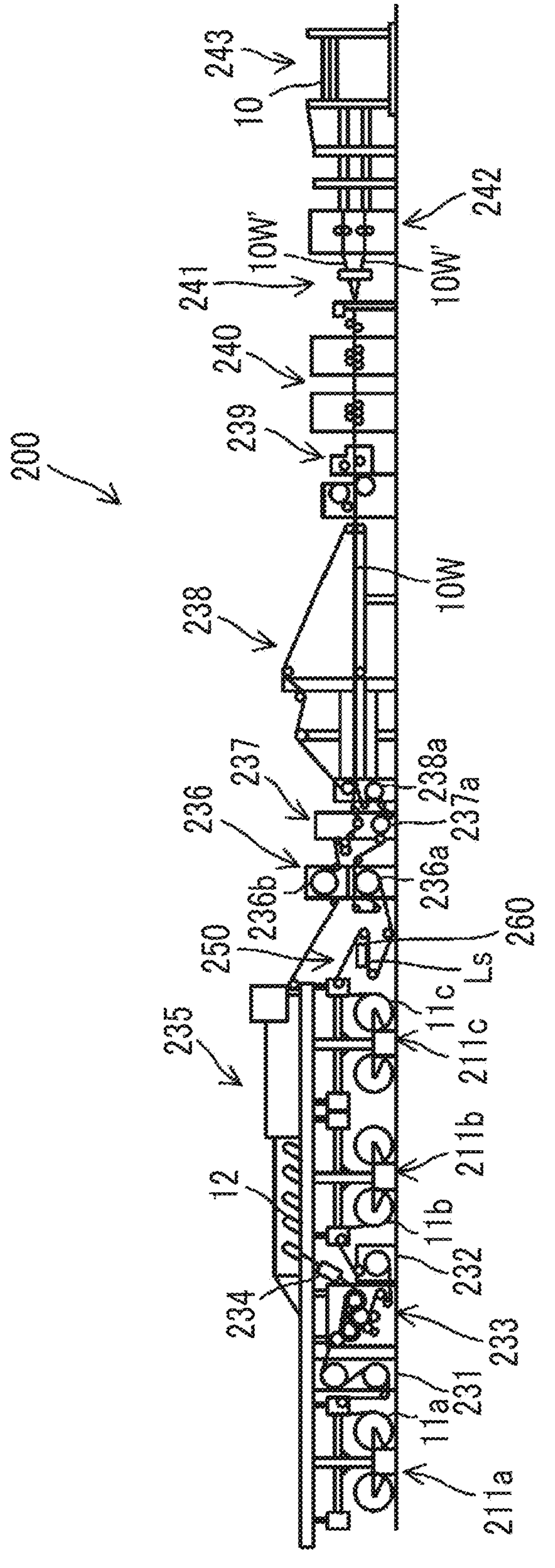
FIG. 5 is a descriptive view of a corrugating machine including an inkjet printing device according to a second embodiment.

FIG. 5 is a descriptive view describing an overall configuration of a corrugating machine 200.

The corrugating machine 200 of the second embodiment is a cardboard sheet-manufacturing apparatus that pastes a bottom liner and a top liner to both surfaces of a medium to manufacture a double-faced cardboard sheet.

The corrugating machine 200 is provided with mill roll stands 211*a*, 211*b*, and 211*c* that supply base papers used for a top liner 11*a*, a medium 11*b*, and a bottom liner 11*c*, to the corrugating machine 200.

The mill roll stands 211*a*, 211*b*, and 211*c* support base paper rolls of the top liner 11*a*, the medium 11*b*, and the bottom liner 11*c*. Two base paper rolls are supported on each of the mill roll stands 211*a*, 211*b*, and 211*c*, and a splicer that joins the base papers fed from the base paper rolls is provided thereabove.

Preheaters 231 and 232 are provided on downstream sides of the mill roll stand 211*a* for the top liner 11*a* and of the mill roll stand 211*b* for the medium 11*b*, respectively. The preheaters 231 and 232 are heaters that preheat the base papers of the top liner 11*a* and the medium 11*b*, respectively. The preheaters 231 and 232 each include a heating roll inside, steam being supplied to the heating roll, and the base paper of each of the top liner 11*a* and the medium 11*b* is wound around the heating roll and is transported, so that the base paper is increased in temperature.

A single facer 233 is provided on a downstream side of the preheater 231 for the top liner 11*a* and the preheater 232 for the medium 11*b*. The single facer 233 creates the medium 11*b* that is corrugated by taking up the base paper of the medium 11*b*, and forms a single-faced cardboard web 12 by applying a glue to flute tips of the medium 11*b* and pasting the top liner 11*a* to the flute tips of the medium 11*b*.

A conveyor 234 formed of a pair of endless belts is provided on a downstream side of the single facer 233, and the single-faced cardboard web 12 is transported to a bridge 235 by the conveyor 234. The bridge 235 is a bridge-shaped portion that delivers the single-faced cardboard web 12 from the single facer 233 to a double facer 238 on the downstream side, and functions as a staying portion that causes the single-faced cardboard web 12 to temporarily stay to absorb a speed difference between the single facer 233 and the double facer 238.

An inkjet printing device 250 is provided on a downstream side of the mill roll stand 211*c* for the bottom liner 11*c*. Incidentally, an installation location of the inkjet printing device 250 is not limited to the present embodiment, and the inkjet printing device 250 may be provided at any location in the corrugating machine 200 as long as printing can be performed on the bottom liner 11*c*.

The inkjet printing device 250 is a printing device that prints a predetermined print pattern on the bottom liner 11*c* by an inkjet method, and is provided between the mill roll stand 211*c* for the bottom liner 11*c* and a preheater 236. The inkjet printing device 250 is formed of a transport path Ls that transports the bottom liner 11*c* from the mill roll stand 211*c* to the preheater 236 on the downstream side, and an inkjet head 260 disposed above the transport path Ls.

The preheater 236 is provided on a downstream side of the bridge 235 and the inkjet printing device 250. The preheater 236 includes a heating roll 236*a* that heats the bottom liner 11*c*, and a heating roll 236*b* that heats the single-faced cardboard web 12, and has the same configuration as that of the preheaters 231 and 232 described above, except for heating the bottom liner 11*c* and the single-faced cardboard web 12.

A glue machine 237 is provided on a downstream side of the preheater 236. The glue machine 237 includes a gluing device that applies a glue to flute tips of the single-faced cardboard web 12, and a heater (heating roll) 237*a* that heats the bottom liner 11*c*, and supplies each of the single-faced cardboard web 12 glued to the flute tips and the bottom liner 11*c* that is heated, to the double facer 238.

The double facer 238 includes a heater (heating roll) 238*a* that heats the bottom liner 11*c*, and the bottom liner 11*c* heated by the heater 238*a* is pasted to flute tips of the single-faced cardboard web 12 to form a cardboard web (single wall cardboard sheet) 10W having a strip shape.

A rotary shear 239 is a rotary cutting device used to cut the cardboard web 10W on an upstream side of a slitter scorer 240 when an order change is made.

The slitter scorer (slitting device) 240 slits the cardboard web 10W created by the double facer 238, along the transport direction MD to create a plurality of pieces of cardboard webs 10W', and performs processing to form creasing lines on the plurality of pieces of cardboard web 10W', the creasing lines extending along the transport direction MD.

A web director 241 provided on a downstream side of the slitter scorer 240 separates and distributes the plurality of pieces of cardboard webs 10W' to a cutoff device 242 in an upper or lower stage. Each of the cutoff devices 242 in the upper and lower stages cuts the cardboard webs 10W' distributed to the upper or lower stage, in the intersecting direction CD to create the cardboard sheets (cardboard sheets) 10 that are final products. Each of the cardboard sheets 10 cut by each of the cutoff devices 242 is sequentially stacked on a stacker 243 in an upper or lower stage.

[2. Detailed Configuration]

<Detailed Configuration of Inkjet Printing Device>

Next, a detailed configuration example of the inkjet printing device 250 will be described. Hereinafter, a case where the corrugating machine 200 creates four pieces of the cardboard sheets 10 will be described as an example.

In the corrugating machine 200 of the second embodiment, the inkjet printing device 250 is different from the inkjet printing device 22 described above in that six inkjet heads (hereinafter, also simply referred to as "heads"), namely, six heads 260A, 260B, 260C, 260D, 260E, and 260F facing a surface of the bottom liner 11*c* (sheet) are provided above the transport path Ls, and other configurations are common to the inkjet printing device 22.

Specifically, each of the heads 260A to 260F includes a plurality of ink ejection ports at a lower surface portion thereof facing the bottom liner 11*c*, the ink ejection ports being arranged along the intersecting direction CD, and printing can be performed within a range where the ink ejection ports are arranged (predetermined printing range in the intersecting direction CD). Incidentally, reference sign 260 is used for the heads when it is not necessary to distinguish between the individual heads 260A to 260F. A detailed configuration of the head 260 such as the arrangement of the ink ejection ports is common to the head 23.

Figure 6:
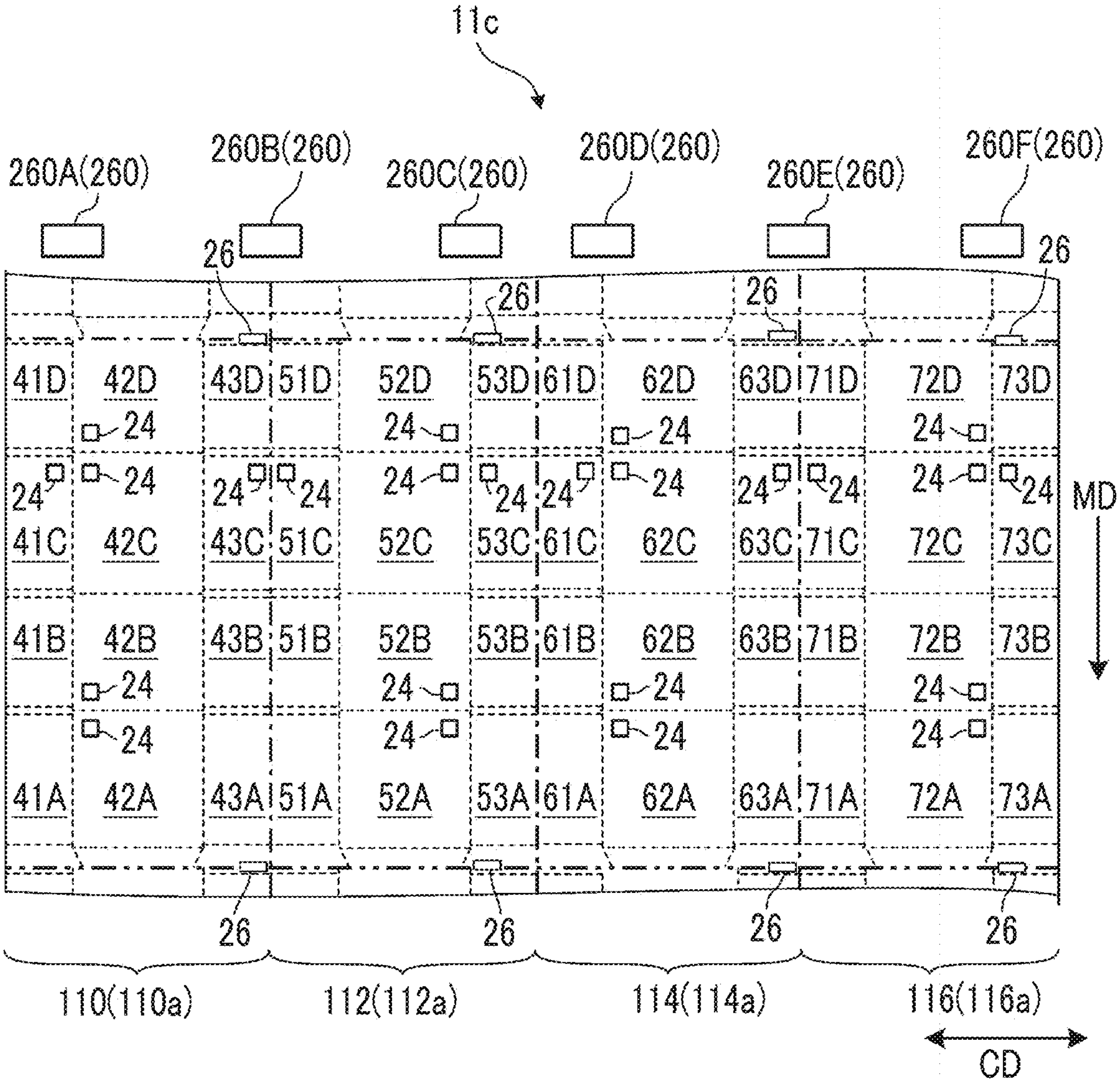
FIG. 6 is a descriptive view of an example of disposition of inkjet heads according to the second embodiment.

FIG. 6 is a descriptive view for describing an example of disposition of the heads 260 with respect to the bottom liner 11*c*, and illustrates a plan view of the bottom liner 11*c* when viewed from above. A direction from a top toward a bottom of the drawing sheet corresponds to the transport direction MD, and a right-left direction of the drawing sheet corresponds to the intersecting direction CD. The bottom liner 11c is transported along the transport path Ls in a posture where a flute of the bottom liner 11c is perpendicular to the transport direction MD. Namely, bottom liners 110, 112, 114, and 116 are transported in a direction rotated by 90 degrees with respect to the transport direction MD when compared to the cardboard sheet 10 of FIG. 3.

<Configuration of Bottom Liner>

Since the corrugating machine 200 creates the four pieces of cardboard sheets 10, the bottom liner 11c of FIG. 6 is divided into four pieces of bottom liners by three planned slitting lines (refer to one-dot chain lines) that extend in the transport direction MD and that are separated from each other in the intersecting direction CD. The planned slitting line is a location that is planned to be slit by the slitter scorer 240 in a rear stage of the inkjet printing device 250. The planned slitting lines are virtual lines along which slitting is planned to be performed, and are not actually illustrated on the surface of the bottom liner 11c. The dimension (predetermined distance) of a piece of the cardboard sheet 10 in the intersecting direction CD is specified for each order.

Four pieces of the bottom liners 11c are aligned from left toward right (from one side toward the other side in the intersecting direction CD) in FIG. 6. In this specification, the four pieces of bottom liners 11c divided by the planned slitting lines are referred to as the bottom liners 110, 112, 114, and 116. Incidentally, reference sign 11c is used for the bottom liners when it is not necessary to distinguish between individual bottom liners.

In the individual bottom liners 110, 112, 114, and 116, locations that are planned to be cut by the cutoff device 242 in a rear stage of the slitter scorer 240 (planned cutting line) are indicated by two-dot chain lines. The planned cutting lines are also virtual lines along which cutting is planned to be performed, and are not actually illustrated on the surface of the bottom liner. There are planned cutting lines (two-dot chain lines) that are separated from each other by a predetermined distance in the transport direction MD.

A cumulative transport distance of the bottom liner 11c in the transport direction MD is measured by a measuring unit (not illustrated). For this reason, the position of a planned cutting line that is separated from a predetermined reference position (for example, a planned cutting line immediately ahead of the planned cutting line) by a predetermined distance (distance between cutoffs) in the transport direction MD can be figured out by calculation based on the measured transport distance. A dimension (predetermined distance) of a piece of the cardboard sheet 10 in the transport direction MD is specified for each order.

In the individual bottom liners 110, 112, 114, and 116, each of ranges 110a, 112a, 114a, and 116a that are partitioned off by the planned slitting lines (refer to one-dot chain lines) and a pair of the planned cutting lines adjacent to each other in the transport direction MD corresponds to a piece of cardboard sheet (one corrugated box).

Further, in the bottom liner 11c of FIG. 6, locations on which grooving, creasing line forming, and punching are planned to be performed by the box making machine (refer to FIG. 1) that processes the cardboard sheet 10 manufactured by the corrugating machine 200 are indicated by broken lines. The broken lines are also virtual lines along which each processing is planned to be performed, and are not actually illustrated on the surface of the bottom liner.

Each of the ranges 110a, 112a, 114a, and 116a of the bottom liners 110, 112, 114, and 116 is divided into 12 regions corresponding to the regions 31A to 31D, to the regions 32A to 32D, and to the regions 33A to 33D of FIG. 3, each range being planned to form a piece of cardboard sheet. However, the 12 regions of FIG. 6 are aligned on a plane having the transport direction MD and the intersecting direction CD in the direction rotated by 90 degrees when compared to the 12 regions, namely, the regions 31A to 31D, 32A to 32D, and 33A to 33D of the cardboard sheet 10 of FIG. 3.

For example, in the range 110a of the bottom liner 110, regions 42A, 42B, 42C, and 42D that are planned to form four side wall portions (a pair of length surfaces and a pair of width surfaces) when a cardboard sheet of the range 110a is assembled into a corrugated box are aligned in the transport direction MD.

Regions 41A, 41B, 41C, and 41D that are planned to form one (a pair of outer flaps and a pair of inner flaps) of a top surface and a bottom surface of the corrugated box when the cardboard sheet is assembled into the corrugated box are located on one side of the regions 42A to 42D in the intersecting direction CD, and regions 43A, 43B, 43C, and 43D that are planned to form the other (a pair of outer flaps and a pair of inner flaps) of the top surface and the bottom surface are located on the other side.

When the sheet of the range 110a is assembled into the corrugated box, the regions 42A and 42C form a pair of length surfaces, and the regions 42B and 42D form a pair of width surfaces. In addition, the regions 41A and 41C form one pair of outer flaps of the top surface and the bottom surface, and the regions 41B and 41D form one pair of inner flaps of the top surface and the bottom surface. In addition, the regions 43A and 43C form the other pair of outer flaps of the top surface and the bottom surface, and the regions 43B and 43D form the other pair of inner flaps of the top surface and the bottom surface.

Each of the ranges 112a, 114a, and 116a of the other bottom liners 112, 114, and 116 is also divided into 12 regions (specifically, regions 51A to 51D, 52A to 52D, and 53A to 53D within the range 112a, regions 61A to 61D, 62A to 62D, and 63A to 63D within the range 114a, or regions 71A to 71D, 72A to 72D, and 73A to 73D within the range 116a) in the same order as the bottom liner 110.

<Disposition of Inkjet Heads>

In the second embodiment, the six heads 260A to 260F are disposed side by side from left toward right in FIG. 6 (from one side toward the other side in the intersecting direction CD) in order with respect to four pieces of the bottom liners 110, 112, 114, and 116 aligned in the intersecting direction CD.

The heads 260A to 260F are disposed to print the identification code 24 (print pattern) in each of the regions within the ranges 110a, 112a, 114a, and 116a of the bottom liners 110, 112, 114, and 116, the regions being planned to form six surfaces of a corrugated box.

Specifically, the head 260A is disposed such that a printing range extends over the regions 41A to 41D of the bottom liner 110 and over the regions 42A to 42D adjacent to the regions 41A to 41D in the intersecting direction CD. For this reason, the head 260A can perform printing on the regions 41A to 41D and on the regions 42A to 42D. In FIG. 6, a case where the head 260A prints the identification code 24 in each of the region 41C and the regions 42A to 42D of the bottom liner 110 is provided as an example.

The head 260B is disposed such that a printing range extends over the regions 43A to 43D of the bottom liner 110 and over the regions 51A to 51D of the bottom liner 112 adjacent to the regions 43A to 43D in the intersecting direction CD. For this reason, the head 260B can perform printing on the regions 43A to 43D of the bottom liner 110 and on the regions 51A to 51D of the bottom liner 112. Namely, the head 260B is common to two pieces of the bottom liners 110 and 112 adjacent to each other in the intersecting direction CD.

In FIG. 6, a case where the head 260B prints the identification code 24 in each of the region 43C of the bottom liner 110 and the region 51C of the bottom liner 112 is provided as an example.

The head 260C is disposed such that a printing range extends over the regions 52A to 52D of the bottom liner 112 and over the regions 53A to 53D adjacent to the regions 52A to 52D in the intersecting direction CD. For this reason, the head 260C can perform printing on the regions 52A to 52D and the regions 53A to 53D of the bottom liner 112.

In FIG. 6, a case where the head 260C prints the identification code 24 in each of the regions 52A to 52D and the region 53C of the bottom liner 112 is provided as an example.

The head 260D is disposed such that a printing range extends over the regions 61A to 61D of the bottom liner 114 and over the regions 62A to 62D adjacent to the regions 61A to 61D in the intersecting direction CD. For this reason, the head 260D can perform printing on the regions 61A to 61D and the regions 62A to 62D of the bottom liner 114.

In FIG. 6, a case where the head 260D prints the identification code 24 in each of the region 61C and the regions 62A to 62D of the bottom liner 114 is provided as an example.

The head 260E is disposed such that a printing range extends over the regions 63A to 63D of the bottom liner 114 and over the regions 71A to 71D of the bottom liner 116 adjacent to the regions 63A to 63D in the intersecting direction CD. For this reason, the head 260E can perform printing on the regions 63A to 63D of the bottom liner 114 and on the regions 71A to 71D of the bottom liner 116. Namely, the head 260E is common to two pieces of the bottom liners 114 and 116.

In FIG. 6, a case where the head 260E prints the identification code 24 in each of the region 63C of the bottom liner 114 and the region 71C of the bottom liner 116 is provided as an example.

The head 260F is disposed such that a printing range extends over the regions 72A to 72D of the bottom liner 116 and over the regions 73A to 73D adjacent to the regions 72A to 72D in the intersecting direction CD. For this reason, the head 260F can perform printing on the regions 72A to 72D and the regions 73A to 73D of the bottom liner 116.

In FIG. 6, a case where the head 260F prints the identification code 24 in each of the regions 72A to 72D and the region 73C of the bottom liner 116.

Incidentally, the heads 260A to 260F of FIG. 6 are also disposed such that a center of each printing range in the intersecting direction CD is aligned with a boundary between the regions 41A to 41D and the regions 42A to 42D, between the regions 43A to 43D and the regions 51A to 51D, between the regions 52A to 52D and the regions 53A to 53D, between the regions 61A to 61D and the regions 62A to 62D, between the regions 63A to 63D and the regions 71A to 71D, or between the regions 72A to 72D and the regions 73A to 73D.

In the above disposition of the heads 260A to 260F, two heads 260 are disposed for a piece of the bottom liner 110, 112, 114, or 116. For example, two heads 260A and 260B are disposed for the bottom liner 110.

Regarding the regions 41C and 42C, it can be said that the head 260A that is one used for a piece of the bottom liner 110 is disposed such that a printing range extends over the region (first region) 41C that is planned to form a top surface (first wall portion) in a state where the cardboard sheet is assembled into the corrugated box, and over the region (second region) 42C that is adjacent to the region 41C in the intersecting direction CD and that is planned to form a length surface (second wall portion different from the first wall portion).

In addition, regarding the region 43C and the region 51C of the bottom liner 112 adjacent to the region 43C in the intersecting direction CD, it can be said that the head 260B that is the other used for the piece of bottom liner 110 is disposed such that a printing range extends over the region (first region) 43C that is planned to form a bottom surface (first wall portion) in a state where the cardboard sheet 10 using the bottom liner 110 is assembled into the corrugated box, and over the region (second region) 51C of the bottom liner 112, which is adjacent to the region 43C in the intersecting direction CD and that is planned to form a wall portion (second wall portion) different from the bottom surface. Namely, the "second wall portion" in this case is a wall portion of a corrugated box which is different from the first wall portion.

Regarding planned processing locations where slitting and cutting are performed by the corrugating machine 200 or grooving, creasing line forming, and punching are performed by the box making machine (refer to FIG. 1), the disposition of the heads 260A to 260F can also be said to be a disposition where the printing range of each of the heads 260A to 260F extends over the planned processing locations extending along the transport direction MD.

Specifically, it can be said that the heads 260A, 260C, 260D, and 260F are disposed such that each printing range extends over a location that is planned to form a creasing line (score) (in other words, a location between regions planned to form a pair of outer flaps and a pair of inner flaps and regions planned to form side surfaces). In addition, it can be said that the heads 260B and 260E are disposed such that each printing range extends over a planned slitting line (refer to a one-dot chain line in FIG. 6).

In the corrugating machine 200, the number of pieces made (piece number) is "4", and the number of the heads 260 to be disposed is 6. Since the related art of FIG. 8 described above requires 12 inkjet heads for a case where the piece number is 4, in the present embodiment, the number of the heads 260 can be significantly reduced when compared to the related art.

The minimum disposition number of the heads 260 is determined according to the piece number. The minimum disposition number is a minimum value of the number of the heads 260 required when the print pattern 24 is printed on six surfaces of the cardboard sheet 10 having a hexahedral shape.

Specifically, when the corrugating machine 200 prints the print pattern 24 on the six surfaces of the cardboard sheet 10 having a hexahedral shape, if the piece number is an odd number "f", a minimum disposition number z of the heads 260 can be obtained by the following Equation 3, and if the piece number is an even number "g", the minimum disposition number z of the heads 260 can be obtained by the following Equation 4.

When the piece number $f$ is an *odd* number: $z=\text{piece number } f\times 1.5+0.5$ Equation 3

When the piece number $g$ is an even number: $z=\text{piece number } g\times 1.5$ Equation 4

Figure 8:
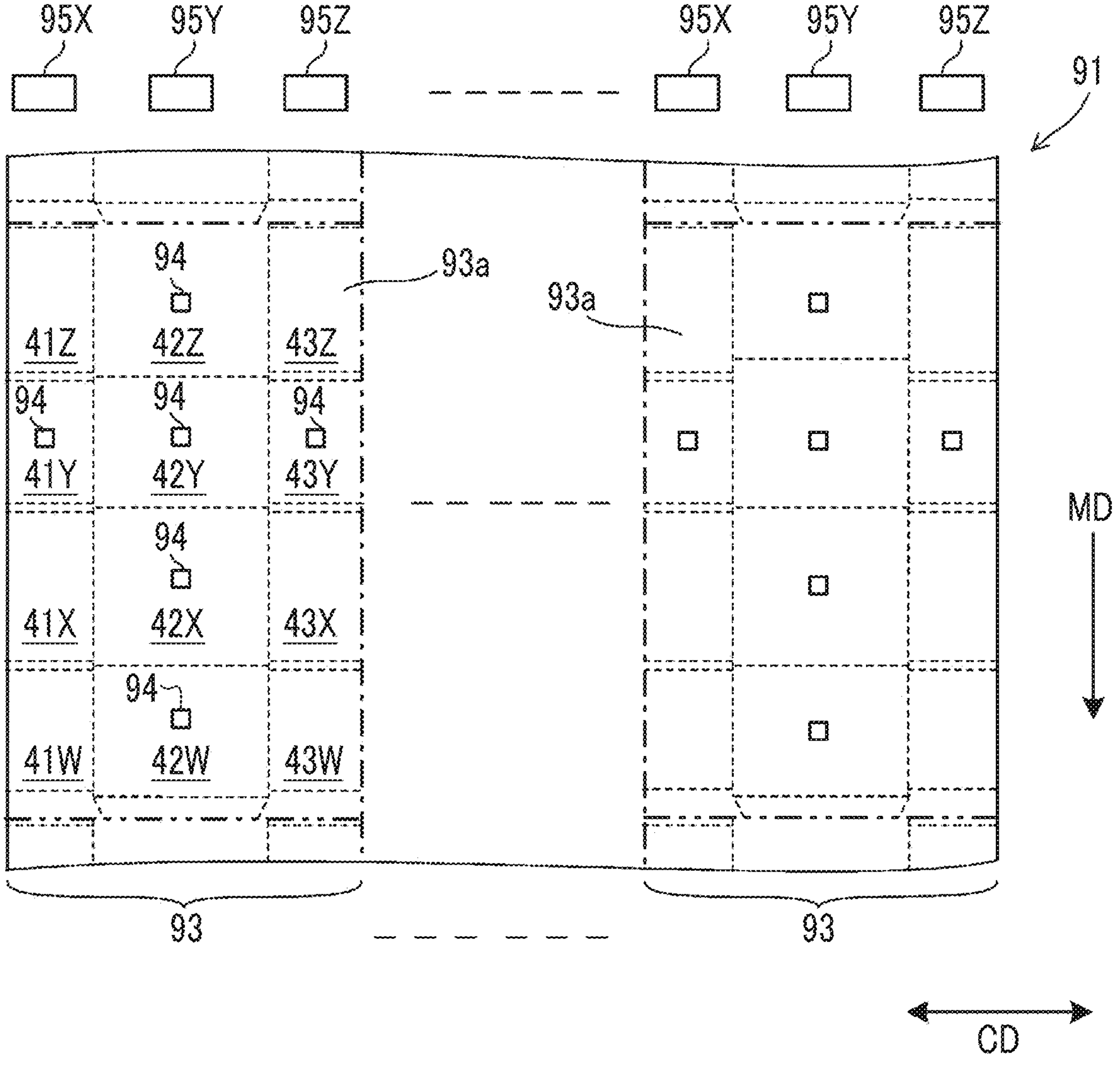
FIG. 8 is a descriptive view of an example of disposition of inkjet heads in a corrugating machine in the related art.

Incidentally, in the case of the related art of FIG. 8, the minimum disposition number z can be obtained by the following Equation 5 regardless of whether the piece number is the odd number "f" or the even number "g".

$$z = \text{piece number } f \text{ (or } g) \times 3 \quad \text{Equation 5}$$

<Printing Using Inkjet Printing Device>

With the above disposition, the heads 260A to 260F can print the identification code 24 in each of the regions that are planned to form six surfaces (six wall portions) of a corrugated box.

Items related to control of printing of the identification code 24, such as control of the heads 260A to 260F by a control device (not illustrated) of the inkjet printing device 250 or a printing margin, may be the same as control of printing of the identification code 24 of the heads 23A and 23B by the control device 22A, and a description thereof will be omitted.

III. Actions and Effects

The inkjet printing devices 22 and 250 described in the above-described embodiments can be figured out, for example, as follows.

(1) The inkjet printing device 22 or 250 described above includes the transport path Ls that transports the sheet 10 (bottom liner 11*c*) as a box-making material to be assembled into a corrugated box including a plurality of wall portions, in the transport direction MD, and the inkjet head 23 or 260 that is disposed to face the surface of the sheet 10 (bottom liner 11*c*) in the transport path Ls and that can print the predetermined print pattern 24 within a predetermined printing range in the intersecting direction CD intersecting the transport direction MD along the surface of the sheet 10 (bottom liner 11*c*). The inkjet head 23 or 260 is disposed such that the printing range extends over the first region that is planned to form the first wall portion when the sheet 10 (bottom liner 11*c*) is assembled into the corrugated box, and over the second region that is adjacent to the first region in the intersecting direction CD and that is planned to form the second wall portion different from the first wall portion.

Since the inkjet head 23 or 260 is disposed such that the printing range extends over two regions adjacent to each other in the intersecting direction CD, printing can be performed on the two regions adjacent to each other in the intersecting direction CD, with only one inkjet head 23 or 260. For this reason, when printing is performed on a plurality of regions that are planned to form wall portions in a state where the cardboard sheet is assembled into the corrugated box, the number of the inkjet heads can be reduced when compared to a configuration in the related art where one inkjet head is provided for each of the regions aligned in the intersecting direction CD. For this reason, maintenance cost such as initial investment cost for the inkjet printing device or operating cost for the inkjet heads is suppressed.

The inkjet head 23 or 260 does not need to be increased in dimension in the intersecting direction CD as long as the printing range can be disposed to extend over two regions adjacent to each other in the intersecting direction CD. For example, a head having the same dimension as in the related art can be used as the inkjet head 23 or 260 of the present embodiment.

In addition, in a corrugating machine of the related art, in order to be able to prevent interference between inkjet heads adjacent to each other in the intersecting direction CD and to handle a sheet having a small dimension in the intersecting direction CD, for example, it is necessary to devise a way of inkjet heads in a staggered manner. On the other hand, in this application, since the number of the inkjet heads is reduced, the corrugating machine 200 can handle a sheet having a small dimension in the intersecting direction CD without adopting a special configuration such as a staggered disposition.

(2) It is preferable that the inkjet printing device 22 or 250 described above includes a plurality of the inkjet heads 23A and 23B or 260A to 260F aligned in the intersecting direction CD.

Since each of the plurality of inkjet heads 23A and 23B or 260A to 260F performs printing on two regions adjacent to each other in the intersecting direction CD, the number of the inkjet heads can be reduced when compared to the configuration in the related art where one inkjet head is provided for each of the regions aligned in the intersecting direction CD.

(3) It is preferable that the inkjet head 23 or 260 described above is configured to print the print pattern 24 in the first region and in the second region, and to print the print pattern 24 in the third region that is planned to form the third wall portion different from the first wall portion and from the second wall portion and that is aligned with the first region or the second region in the transport direction MD.

Accordingly, the print pattern 24 can be printed not only in the first region and the second region adjacent to each other in the intersecting direction CD but also in a plurality of regions aligned with the first region or the second region in the transport direction MD, with only one inkjet head 23 or 260. For this reason, it is possible to print the print pattern 24 in more regions while reducing the number of the inkjet heads.

(4) It is preferable that the inkjet head 23 or 260 prints an identification code of a corrugated box assembled from the sheet 10 (bottom liner 11*c*), as the print pattern 24.

Accordingly, the identification code 24 can be printed on a large number of wall portions of the corrugated box by the inkjet printing device 22 or 250 in which the number of the inkjet heads 23 or 260 is reduced.

(5) It is preferable that the inkjet head 23 or 260 is configured to print the print pattern 24 such that a predetermined printing margin is provided around the print pattern 24. It is preferable that the printing margin is determined based on a dimension of a planned processing location between two regions and a predetermined value.

Since the printing margin determined based on the dimension of the planned processing location and the predetermined value is provided, it is possible to secure a predetermined quiet zone while considering deformation of the cardboard sheet 10 caused by processing performed when the cardboard sheet 10 is assembled into the corrugated box.

(6) It is preferable that the sheet 10 (bottom liner 11*c*) is assembled into the corrugated box having a polyhedral shape. In that case, it is preferable that two inkjet heads 23A and 23B or the inkjet heads 260A to 260F are provided for the sheet 10 (bottom liner 11*c*) for one box and that the two inkjet heads 23A and 23B or the inkjet heads 260A to 260F are configured to print the print pattern 24 in each of regions that are planned to form wall portions forming an external appearance when the sheet 10 (bottom liner 11*c*) is assembled into the corrugated box.

The print pattern 24 is printed in each of the regions that are planned to form the wall portions of the corrugated box having a polyhedral shape, with only the two inkjet heads 23A and 23B or only the inkjet heads 260A to 260F. For this reason, the print pattern 24 can be printed on the wall portions of the corrugated box by a smaller number of the inkjet heads when compared to the configuration in the related art where one inkjet head is provided for each of the regions aligned in the intersecting direction.

(7) It is preferable that the inkjet printing device 22 described above is mounted in the box making machine 100.

In this case, the number of the inkjet heads 23 provided in the inkjet printing device 22 of the box making machine 100 can be reduced.

(8) It is preferable that the inkjet printing device 250 described above is mounted in the corrugating machine 200.

In this case, the number of the inkjet heads 260 provided in the inkjet printing device 250 of the corrugating machine 200 can be reduced.

(9) The corrugating machine 200 includes the slitter scorer (slitting device) 240. The slitting device slits a sheet along the transport direction MD to create a plurality of pieces of sheets aligned in the intersecting direction CD. In this case, it is preferable that the inkjet head 260 is disposed such that the printing range extends over the first region (for example, the region 43C) in a first sheet (for example, the bottom liner 110) of four pieces (plurality of pieces) of sheets (bottom liners 110, 112, 114, and 116), and over the second region (for example, the region 51C) in a second sheet (for example, the bottom liner 112) adjacent to the first sheet (for example, the bottom liner 110) in the intersecting direction CD.

Since one inkjet head 260 is common to the plurality of pieces of sheets, the number of the inkjet heads 260 can be further reduced.

IV. Others

The box making machine 100 described above is one example, and is not limited to one described above, and the corrugated box-manufacturing apparatus (box making machine) may be any apparatus as long as the apparatus manufactures the folded cartonboard boxes 10$a$. Examples of the box making machine in which the inkjet printing device of the present embodiment performs printing include a die cutter (die cutting machine) and a plate punching machine for a cardboard sheet, in addition to the box making machine 100 (folding apparatus).

A structure of the corrugating machine 200 is not limited to the structure illustrated in FIG. 5, and may be any structure. For example, the corrugating machine 200 may be structured to manufacture a multi-layer cardboard sheet such as a double wall cardboard sheet in which flute tips of a single-faced cardboard sheet are pasted to one side of a double-faced cardboard sheet, or a triple wall cardboard sheet in which flute tips of a single-faced cardboard sheet are pasted to one side of a double-faced cardboard sheet.

The corrugating machine 200 is not limited to a structure to make four pieces, and may have an arbitrary structure to make a plurality of pieces of sheets or may have a structure without a device that slits a sheet into a plurality of pieces.

The region in which each of the inkjet heads 23 and 260 prints the identification code 24 is not limited to the illustrated example, and may be any region. In addition, the inkjet head 23 or 260 is not limited to printing the identification code 24 in regions (six regions) corresponding to all six surfaces of a corrugated box, and may print the identification code 24 in a plurality of regions that are planned to form some of a plurality of surfaces (plurality of wall portions) of a corrugated box, such as printing the identification code 24 only on four side surfaces of the corrugated box or printing the identification code 24 on a part of a top surface and a side surface of the corrugated box.

In addition, the inkjet head 23 or 260 may print the identification code 24 in regions (for example, the region 33B and the like in FIG. 3) that are planned to form portions (for example, inner flaps) that do not form an external appearance when the sheet 10 (bottom liner 11$c$) is assembled into the corrugated box. For example, the inkjet heads 23A and 23B may print the identification code 24 in all the 12 regions of the sheet 10 in FIG. 3.

The disposition or the mounting number of the inkjet heads 23 and of the inkjet heads 260 is not limited to the illustrated examples. For example, the inkjet printing device 22 of the box making machine 100 may be provided with only one of the heads 23A and 23B. In addition, the inkjet printing device 22 may have a structure where one head is disposed to extend over the regions 31B, 32B, and 33B and over the regions 31C, 32C, and 33D in the cardboard sheet 10. Even in this case, the identification code 24 can be printed on a plurality of surfaces (up to four surfaces) of a corrugated box, and the number of the inkjet heads can be reduced when compared to the configuration in the related art where one inkjet head is provided for each of the regions aligned in the intersecting direction CD.

In addition, in the inkjet printing device 250 of the corrugating machine 200, two heads 260 may be provided for each of the bottom liners (110, 112, 114, and 116) for one box. In that case, if the corrugating machine 200 has a structure to make where four pieces are to be made, a total of eight heads 260 are mounted in the inkjet printing device 250. Even in this configuration, the number of the inkjet heads can be reduced when compared to the configuration in the related art where one inkjet head is provided for each of the regions aligned in the intersecting direction CD. Alternatively, one head 260 may be provided for each of the bottom liners (110, 112, 114, and 116) for one box. Also, in this case, the identification code 24 can be printed on a plurality of surfaces (up to five surfaces) of a corrugated box, and the number of the inkjet heads can be reduced when compared to the configuration in the related art where one inkjet head is provided for each of the regions aligned in the intersecting direction CD.

The identification code 24 is not limited to a code for identifying the individual cardboard sheets 10, and may be, for example, a code representing any other information, such as a code representing a manufacturer of the cardboard sheet 10 or a code representing an article that is planned to be packed after the cardboard sheet 10 is assembled into the corrugated box.

The print pattern is not limited to the identification code 24. The print pattern may be other arbitrary picture patterns such as a care mark that instructs a luggage handling procedure. In addition, the print pattern is not limited to the picture pattern, and may be a letter or a number.

A plurality of print patterns may be printed in one region that is planned to form one wall portion when a cardboard sheet is assembled into a corrugated box.

Different print patterns may be printed in a plurality of regions that are planned to form a plurality of wall portions when a cardboard sheet is assembled into a corrugated box.

Figure 7:
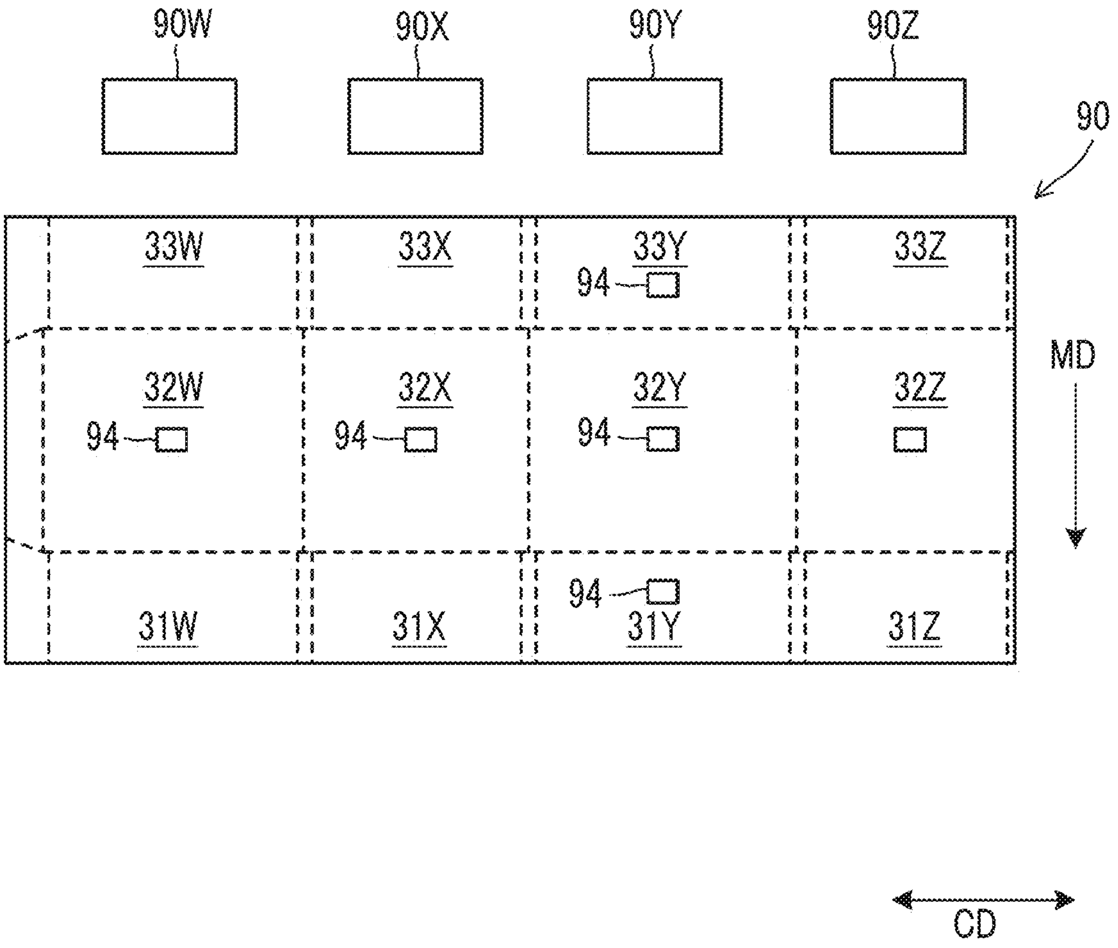
FIG. 7 is a descriptive view of an example of disposition of inkjet heads in a box making machine in the related art.

The corrugated box assembled from a sheet is not limited to a hexahedral shape, and may be a corrugated box having a polyhedral shape. The polyhedron referred in this specification is a three-dimensional body having a plurality of surfaces (four or more surfaces) forming a plurality of wall portions. The corrugated box having a polyhedral shape includes, for example, a corrugated box having a pentahedral shape obtained by removing a top surface from a corrugated box having a hexahedral shape (refer to, for example, FIG. 7).

REFERENCE SIGNS LIST

1 Sheet feeding section
2 Printing section
3 Slotter creaser section
4 Die cutting section
5 Folding section
6 Counter-ejector section
7 Transport conveyor
10 Cardboard sheet (sheet)
10W Cardboard web
10*a* Folded cartonboard box
11*c* Bottom liner
12 Single-faced cardboard web
21A to 21D Flexographic printing section
22, 250 Inkjet printing device
22A Control device
23, 23A, 23B, 260, 260A to 260F Inkjet head
24 Identification code (print pattern)
31A to 31D, 32A to 32D, 33A to 33D Region
41A to 41D, 42A to 42D, 43A to 43D Region
51A to 51D, 52A to 52D, 53A to 53D Region
61A to 61D, 62A to 62D, 63A to 63D Region
71A to 71D, 72A to 72D, 73A to 73D Region
100 Box making machine
200 Corrugating machine
211 Mill roll stand
231, 232, 236 Preheater
233 Single facer
234 Conveyor
235 Bridge
236*a*, 236*b* Heating roll
237 Glue machine
238 Double facer
238*a* Heater
239 Rotary shear
240 Slitter scorer
241 Web director
242 Cutoff device
243 Stacker
270 Measuring unit
280 Detecting unit
CD Intersecting direction
Ls Transport path
MD Transport direction
P1A, P1B Printing range

The invention claimed is:

1. An inkjet printing device comprising:
a transport path for transporting a sheet as a box-making material to be assembled into a corrugated box including a plurality of wall portions, in a transport direction; and
an inkjet head that is disposed to face a surface of the sheet in the transport path and configured to print a predetermined print pattern in a predetermined printing range in an intersecting direction which is a direction intersecting the transport direction along the surface of the sheet and corresponds to a width direction of the sheet, wherein
the transport path transports, when the inkjet printing device is operating, the sheet in the transport direction in a posture where planned processing locations, where processing for making the corrugated box is planned to be performed, extend in the transport direction, and where the planned processing locations are aligned in the intersecting direction; and
the one inkjet head is disposed such that the printing range extends over only one of the planned processing locations.

2. The inkjet printing device according to claim 1,
wherein the inkjet head is configured
to print the print pattern in a first region planned to form a first wall portion when the sheet is assembled into the corrugated box and in a second region planned to form a second wall portion different from the first wall portion, and
to print the print pattern in one or more third regions that are planned to form a third wall portion different from the first wall portion and from the second wall portion, and that are aligned with the first region or the second region in the transport direction.

3. The inkjet printing device according to claim 2,
wherein the inkjet head is configured to print an identification code of the corrugated box assembled from the sheet, as the print pattern.

4. The inkjet printing device according to claim 2,
wherein the inkjet head is configured to print the print pattern such that a predetermined printing margin is provided around the print pattern, and
the printing margin is determined based on a dimension of the planned processing location and a predetermined value.

5. The inkjet printing device according to claim 2,
wherein the sheet is assembled into the corrugated box having a polyhedral shape,
two inkjet heads are provided for the sheet for one box, and
the two inkjet heads are configured to print the print pattern in regions that are planned to form the wall portions forming an external appearance when the sheet is assembled into the corrugated box.

6. A box making machine comprising:
the inkjet printing device according to claim 2.

7. A corrugating machine comprising:
the inkjet printing device according to claim 2.

8. The corrugating machine according to claim 7 further comprising:
a slitting device configured to slit the sheet along the transport direction to create a plurality of pieces of sheets aligned in the intersecting direction,
wherein the inkjet head is disposed such that the printing range extends over the first region in a first sheet of the plurality of pieces of sheets, and over the second region in a second sheet adjacent to the first sheet being interposed by the one planned processing location in the intersecting direction.

9. The inkjet printing device according to claim 2,
wherein the transport path transfers, when the inkjet printing device is operating, the sheet in the transport direction in such a posture that four regions that are planned to form four side wall portions when the sheet is assembled into the corrugated box are aligned in the intersecting direction, and
the planned processing locations are each to be subjected to grooving or creasing line forming.

10. The inkjet printing device according to claim 2,
wherein the transport path transfers, when the inkjet printing device is operating, the sheet in the transport direction in such a posture that four regions that are planned to form four side wall portions when the sheet is assembled into the corrugated box are aligned in the transport direction, and the planned processing locations are each to be subjected to creasing line forming or slitting.

11. The inkjet printing device according to claim 1, wherein the inkjet head is configured to print an identification code of the corrugated box assembled from the sheet, as the print pattern.

12. The inkjet printing device according to claim 1, wherein the inkjet head is configured to print the print pattern such that a predetermined printing margin is provided around the print pattern, and the printing margin is determined based on a dimension of the planned processing location and a predetermined value.

13. The inkjet printing device according to claim 1, wherein the sheet is assembled into the corrugated box having a polyhedral shape, two inkjet heads are provided for the sheet for one box, and the two inkjet heads are configured to print the print pattern in regions that are planned to form the wall portions forming an external appearance when the sheet is assembled into the corrugated box.

14. A box making machine comprising:

the inkjet printing device according to claim 1.

15. A corrugating machine comprising:

the inkjet printing device according to claim 1.

16. The corrugating machine according to claim 15, further comprising:

a slitting device configured to slit the sheet along the transport direction to create a plurality of pieces of sheets aligned in the intersecting direction, wherein the inkjet head is disposed such that the printing range extends over the first region in a first sheet of the plurality of pieces of sheets, and over the second region in a second sheet adjacent to the first sheet being interposed by the one planned processing location in the intersecting direction.

17. The inkjet printing device according to claim 1, wherein the transport path transfers, when the inkjet printing device is operating, the sheet in the transport direction in such a posture that four regions that are planned to form four side wall portions when the sheet is assembled into the corrugated box are aligned in the intersecting direction, and the planned processing locations are each to be subjected to grooving or creasing line forming.

18. The inkjet printing device according to claim 1, wherein the transport path transfers, when the inkjet printing device is operating, the sheet in the transport direction in such a posture that four regions that are planned to form four side wall portions when the sheet is assembled into the corrugated box are aligned in the transport direction, and the planned processing locations are each to be subjected to creasing line forming or slitting.

* * * * *